(12) United States Patent
Choi (10) Patent No.: US 10,574,077 B2
(45) Date of Patent: Feb. 25, 2020

(54) METHOD FOR CHARGING ELECTRONIC DEVICE, ELECTRONIC DEVICE, AND STORAGE MEDIUM

(71) Applicant: Samsung Electronics Co., Ltd., Suwon-si, Gyeonggi-do (KR)

(72) Inventor: Dae-Han Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 15/817,694

(22) Filed: Nov. 20, 2017

(65) Prior Publication Data

US 2018/0175636 A1 Jun. 21, 2018

(30) Foreign Application Priority Data

Dec. 15, 2016 (KR) ........................ 10-2016-0172032

(51) Int. Cl.
| | |
|---|---|
| G06F 1/00 | (2006.01) |
| H02J 7/00 | (2006.01) |
| G06F 1/26 | (2006.01) |
| G06F 1/324 | (2019.01) |
| G06F 1/3287 | (2019.01) |
| G06F 3/06 | (2006.01) |
| G06F 13/38 | (2006.01) |
| G06F 13/42 | (2006.01) |

(52) U.S. Cl.
CPC .............. *H02J 7/007* (2013.01); *G06F 1/266* (2013.01); *G06F 1/324* (2013.01); *G06F 1/3287* (2013.01); *G06F 3/065* (2013.01); *G06F 3/0625* (2013.01); *G06F 3/0679* (2013.01); *G06F 13/385* (2013.01); *G06F 13/4282* (2013.01); *H02J 7/0047* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 2010/0118180 A1* | 5/2010 | Matsushita | ............ H04N 5/232 348/372 |
| 2013/0097458 A1 | 4/2013 | Sekino et al. | |
| 2015/0123597 A1 | 5/2015 | Son | |
| 2015/0207361 A1 | 7/2015 | Jung et al. | |
| 2015/0270733 A1* | 9/2015 | Inha | ...................... H02J 7/0054 320/103 |
| 2016/0218539 A1 | 7/2016 | Herrmann et al. | |

(Continued)

FOREIGN PATENT DOCUMENTS

| | | |
|---|---|---|
| KR | 10-2007-0117260 A | 12/2007 |
| KR | 10-2010-0009225 A | 1/2010 |

(Continued)

*Primary Examiner* — Nitin C Patel
(74) *Attorney, Agent, or Firm* — Jefferson IP Law, LLP (57) ABSTRACT

A method and apparatus for charging an electronic device and a storage medium are provided. The electronic device includes a rechargeable battery; a charging port; and at least one processor configured to: if a supply power amount of power supplied from an outside through the charging port is smaller than a use power amount of power used by the electronic device and a remaining amount of the battery is smaller than or equal to a reference value, switch the electronic device to a power-saving mode. Also, other embodiments may be implemented.

11 Claims, 9 Drawing Sheets

(56) References Cited

U.S. PATENT DOCUMENTS

2016/0372936 A1\* 12/2016 Agarwal ................ H02J 7/007
2017/0005494 A1\* 1/2017 Li ........................ H02J 7/0044
2017/0126039 A1\* 5/2017 Nguyen ................ H02J 7/0052

FOREIGN PATENT DOCUMENTS

KR 10-2015-0052411 A 5/2015
KR 10-1646207 B1 8/2016

\* cited by examiner

METHOD FOR CHARGING ELECTRONIC DEVICE, ELECTRONIC DEVICE, AND STORAGE MEDIUM

CROSS-REFERENCE TO RELATED APPLICATION(S)

This application claims the benefit under 35 U.S.C. § 119(a) of a Korean patent application filed on Dec. 15, 2016 in the Korean Intellectual Property Office and assigned Serial number 10-2016-0172032, the entire disclosure of which is hereby incorporated by reference.

TECHNICAL FIELD

The present disclosure relates to a method for charging an electronic device.

BACKGROUND

An electronic device using a battery controls the supply of power through various methods in order to reduce the consumption of the battery. For example, when a remaining amount of a battery is smaller than or equal to a set value, an electronic device can perform a power-saving mode in order to reduce a discharge current of the battery. In the power-saving mode, the electronic device can control power consumption by adjusting the number of central processing unit (CPU) clocks/cores and the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method capable of preventing sudden shutdown of an electronic device being charged with power lower than rated power and protecting data within the electronic device, and an electronic device using the same.

According to the execution of various functions and/or multiple functions by current electronic devices, power consumption by a central processing unit (CPU) and the size of a display becomes larger and thus, power consumption is rapidly increasing. Accordingly, in order to solve a power problem, a user can drive an electronic device in a state of execution of charging. In this case, in a state of execution of a charging operation, the electronic device consumes required power regardless of power used for charging. For example, when an application requiring a large current, including navigation/moving image/game or the like, is executed for a long time, power consumed by the electronic device may become larger than power supplied to a battery of the electronic device. In this case, actually, the battery of the electronic device may not be charged but may be drained, and thus, the electronic device may be suddenly shut down due to the discharge of the battery. An aspect of the present disclosure is to provide a method capable of preventing sudden shutdown of an electronic device being charged with power lower than rated power and protecting data within the electronic device, and an electronic device using the same.

In accordance with an aspect of the present disclosure, an electronic device is provided. The electronic device includes a rechargeable battery; a charging port; and at least one processor configured to: if a supply power amount of power supplied from an outside through the charging port is smaller than a use power amount of power used by the electronic device and a remaining amount of the battery is smaller than or equal to a reference value, switch the electronic device to a power-saving mode.

In accordance with another aspect of the present disclosure, a method for operating an electronic device including a rechargeable battery is provided. The method includes comparing a supply power amount of power supplied from an outside through a charging port with a use power amount of power used by the electronic device, if the use power amount is larger than the supply power amount, determining whether a remaining amount of the rechargeable battery is smaller than or equal to a reference value, and if the remaining amount of the rechargeable battery is smaller than or equal to the reference value, switching the electronic device to a power-saving mode.

In accordance with another aspect of the present disclosure, a storage medium storing instructions configured to cause at least one processor to perform at least one operation when executed by at least one processor is provided. The at least one operation may include: when power is supplied from an outside through a charging port, comparing a supply power amount of power supplied from an outside through a charging port with a use power amount of power used by the electronic device; if the use power amount is larger than the supply power amount, determining whether a remaining amount of power in a battery of the electronic device is smaller than or equal to a reference value; and if the remaining amount of power in the battery is smaller than or equal to the reference value, switching the electronic device to a power-saving mode.

Another aspect of the present disclosure is to provide a method capable of preventing sudden shutdown of an electronic device being charged with power lower than rated power and protecting data within the electronic device, and an electronic device using the same.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an" and "the" include plural referents unless the context clearly dictates otherwise. Thus, for example, reference to "a component surface" includes reference to one or more of such surfaces.

In the present disclosure, the expression "configured to" may be exchanged with, for example, "suitable for", "having the capacity to", "adapted to", "made to", "capable of", or "designed to" in terms of hardware or software, according to circumstances. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an Moving Picture Experts Group (MPEG-1 or MPEG-2) audio layer-3 (MP3) player, a medical device, a camera, and a wearable device. According to various embodiments of the present disclosure, the wearable device may include at least one of an accessory type (e.g., a watch, a ring, a bracelet, an anklet, a necklace, glasses, a contact lens, or a head-mounted device (HMD)), a fabric- or clothing-integrated type (e.g., an electronic clothing), a body-mounted type (e.g., a skin pad or tattoo), and a bio-implantable type (e.g., an implantable circuit). According to some embodiments of the present disclosure, the electronic device may include at least one of, for example, a television, a digital versatile disc (DVD) player, an audio player, a refrigerator, an air conditioner, a vacuum cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global navigation satellite system (GNSS), an event data recorder (EDR), a flight data recorder (FDR), a vehicle infotainment device, electronic devices for a ship (e.g., a navigation device for a ship, a gyro-compass, etc.), avionics, security devices, an automotive head unit, a robot for home or industry, a drone, an automated teller's machine (ATM) in banks, a point-of-sales (POS) terminal in a shop, and an internet-of-things (IOT) device (e.g., a light bulb, various sensors, a sprinkler device, a fire alarm, a thermostat, a streetlamp, a toaster, sporting goods, a hot water tank, a heater, a boiler, etc.). According to some embodiments of the present disclosure, the electronic device may include at least one of a part of a piece of furniture, a building/structure, or a motor vehicle, an electronic board, an electronic signature receiving device, a projector, and various kinds of measuring instruments (e.g., a water meter, an electric meter, a gas meter, and a radio wave meter). In various embodiments of the present disclosure, the electronic device may be flexible, or may be a combination of two or more of the aforementioned various devices. The electronic device according to an embodiment of the present disclosure is not limited to the aforementioned devices. In the present disclosure, the term "user" may indicate a person using an electronic device or a device (e.g. an artificial intelligence electronic device) using an electronic device.

Figure 1:
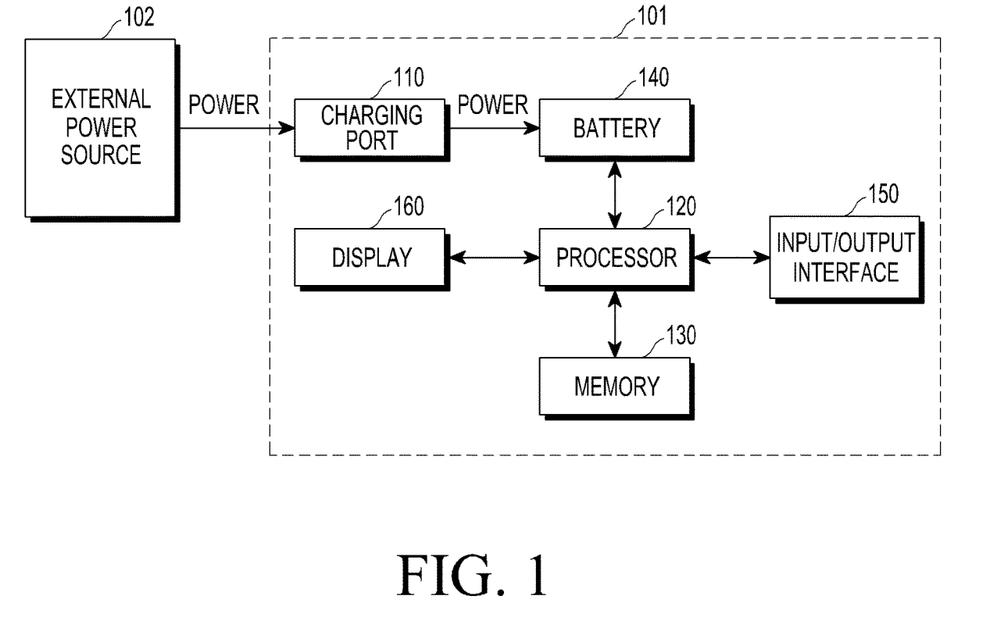
FIG. 1 is a block diagram illustrating a configuration of an electronic device according to an embodiment of the present disclosure.

FIG. 1 is a block diagram illustrating a configuration of an electronic device according to an embodiment of the present disclosure.

Referring to FIG. 1, the electronic device 101 may include a charging port 110, a processor 120, a memory 130, a battery 140, an input/output interface 150, or a display 160.

The charging port 110 is configured to be connected to an external power source 102, and may deliver power, which is supplied from the external power source 102, to the battery 140. The battery 140 may receive power from the external power source 102 through the charging port 110. The charging port 110 may be, for example, a C-type universal serial bus (USB) port.

The processor 120 may determine whether power is being supplied from the outside (e.g., the external power source 102) to the electronic device 101 through the charging port 110. When power is supplied from the outside, the processor 120 may compare a supply power amount of power supplied through the charging port 110 with a use power amount of power used by the electronic device 101. The processor 120 may compare a supply power amount of power supplied to the electronic device 101 with a use power amount during a reference time period (e.g., 5 minutes). The processor 120 may control an operation of the electronic device 101 based on a result of the comparison of the supply power amount with the use power amount. When the use power amount is smaller than or equal to the supply power amount, the processor 120 may control the electronic device 101 to maintain a current state. When the use power amount is larger than the supply power amount, the processor 120 may determine whether a remaining amount of the battery 140 is smaller than or equal to a predetermined reference value (e.g., 5%). When the remaining amount of the battery 140 is larger than the reference value, the processor 120 may control the electronic device 101 to maintain a current state of receiving power from the external power source 102.

When it is determined that the remaining amount of the battery 140 is smaller than or equal to the reference value, the processor 120 may switch an operating mode of the electronic device 101 to a power-saving mode. In the power-saving mode, the processor 120 may store data, which is related to at least one application being executed by the electronic device 101, in the memory 130, particularly, a non-volatile memory, of the electronic device 101. Thereafter, the processor 120 may turn off power of the electronic device 101. The switching to the power-saving mode and the storage of data may be performed before power of the electronic device 101 becomes 0%, that is, the electronic device 101 is shut down. Accordingly, the electronic device 101 can prevent the loss of data (or temporarily-stored data) in the case of sudden shutdown of the electronic device 101. Also, even after power of the electronic device 101 is turned off, the electronic device 101 may receive power from the external power source 102 through the charging port 110 and may charge the battery 140.

When the electronic device 101 is switched to the power-saving mode, the memory 130 may store data related to at least one application being executed by the electronic device 101. The memory 130 may be implemented to include a non-volatile memory. When the electronic device 101 is switched to the power-saving mode, the processor 120 may store data, which is related to at least one application being executed by the electronic device 101, in a non-volatile memory. The data related to the at least one application may be stored in a non-volatile memory as described above, and thus, the electronic device 101 can prevent the loss of data (or temporarily-stored data) caused by sudden shutdown of the electronic device 101.

The battery 140 may be provided with power for driving the electronic device 101. The battery 140 may receive power from the external power source 102 through the charging port 110. The processor 120 may check the battery 140 for a remaining amount at preset time periods (e.g., 5 minutes).

The input/output interface 150 may receive a command or data input to the electronic device 101, or may output a command or data, which is output from the electronic device 101, to a user or an external device.

An electronic device according to various embodiments of the present disclosure may include: a supply power amount of power supplied from an outside through a charging port with a use power amount of power used by the electronic device; if the use power amount is larger than the supply power amount, determining whether a remaining amount of the battery is smaller than or equal to a reference value; and if the remaining amount of the battery is smaller than or equal to the reference value, switching the electronic device to a power-saving mode.

Figure 2:
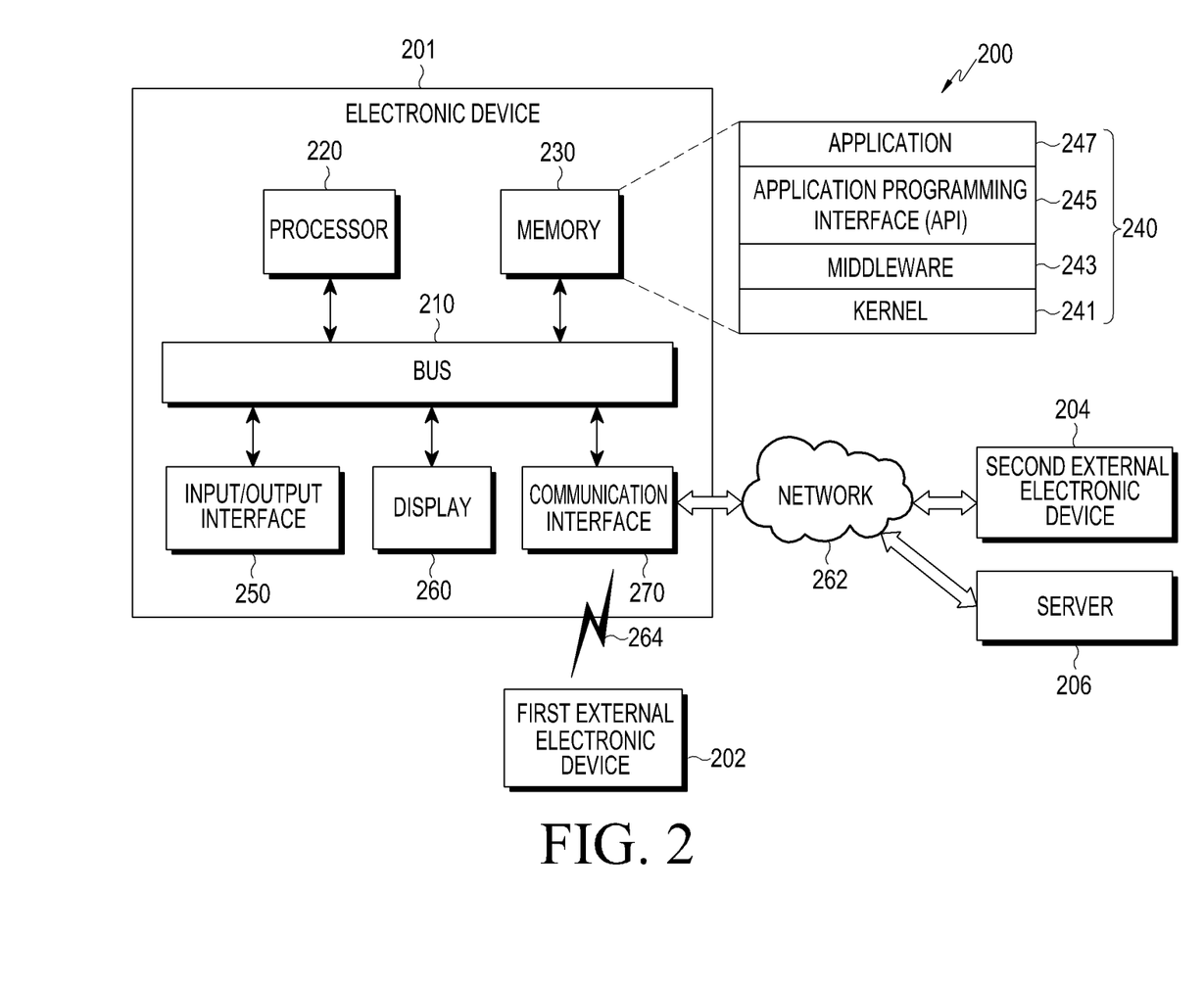
FIG. 2 is a view illustrating an electronic device within a network environment according to an embodiment of the present disclosure.

FIG. 2 is a view illustrating an electronic device within a network environment according to an embodiment of the present disclosure.

Referring to FIG. 2, the electronic device 201 within the network environment 200 may include a bus 210, a processor 220, a memory 230, an input/output interface 250, a display 260, and a communication interface 270. In some embodiments of the present disclosure, at least one of the above elements of the electronic device 201 may be omitted from the electronic device 201, or the electronic device 201 may additionally include other elements.

The bus 210 may include a circuit that interconnects the elements 220 to 270 and delivers a communication (e.g., a control message or data) between the elements 220 to 270.

The processor 220 may include one or more of a CPU, an AP, and a communication processor (CP). The processor 220 may perform, for example, calculations or data processing related to control over and/or communication by at least one of the other elements of the electronic device 201.

The memory 230 may include a volatile memory and/or a non-volatile memory. The memory 230 may store, for example, commands or data related to at least one of the other elements of the electronic device 201. According to an embodiment of the present disclosure, the memory 230 may store software and/or a program 240. The program 240 may include, for example, a kernel 241, middleware 243, an application programming interface (API) 245, and/or an application program (or an application) 247. At least some of the kernel 241, the middleware 243, and the API 245 may be referred to as an "operating system (OS)." For example, the kernel 241 may control or manage system resources (e.g., the bus 210, the processor 220, the memory 230, etc.) used to execute operations or functions implemented by the other programs (e.g., the middleware 243, the API 245, and the application program(s) 247). Also, the kernel 241 may provide an interface capable of controlling or managing the system resources by accessing the individual elements of the electronic device 201 by using the middleware 243, the API 245, or the application program(s) 247.

The middleware 243 may serve as an intermediary that enables the API 245 or the application program(s) 247 to communicate with the kernel 241 and to exchange data therewith. Also, the middleware 243 may process one or more task requests received from the application program(s) 247 according to a priority. For example, the middleware 243 may assign a priority, which enables the use of system resources (e.g., the bus 210, the processor 220, the memory 230, etc.) of the electronic device 201, to at least one of the application program(s) 247, and may process the one or more task requests according to the assigned priority. The API 245 is an interface through which the application program(s) 247 controls a function provided by the kernel 241 or the middleware 243, and may include, for example, at least one interface or function (e.g., command) for file control, window control, image processing, character control, or the like.

The input/output interface 250 may deliver a command or data, which is input from a user or another external device, to the element(s) other than the input/output interface 250 within the electronic device 201, or may output, to the user or another external device, commands or data received from the element(s) other than the input/output interface 250 within the electronic device 201.

The display 260 may include a liquid crystal display (LCD), a light-emitting diode (LED) display, an organic LED (OLED) display, a microelectromechanical systems (MEMS) display, and an electronic paper display. The display 260 may display various pieces of content (e.g., text, images, videos, icons, symbols, and/or the like.) to the user. The display 260 may include a touch screen, and may receive, for example, a touch input, a gesture input, a proximity input, or a hovering input provided by an electronic pen or a body part of the user.

The communication interface 270 may establish, for example, communication between the electronic device 201 and an external device (e.g., a first external electronic device 202, a second external electronic device 204, or a server 206). The communication interface 270 may be connected to a network 262 through wireless or wired communication and may communicate with the external device (e.g., the second external electronic device 204 or the server 206).

The types of wireless communication may include, for example, cellular communication which uses at least one of long-term evolution (LTE), LTE-advanced (LTE-A), code division multiple access (CDMA), wideband CDMA (WCDMA), universal mobile telecommunications system (UNITS), WiBro (Wireless Broadband), and global system for mobile communications (GSM). According to an embodiment of the present disclosure, the types of wireless communication may include at least one of Wi-Fi, Bluetooth (BT), BT low energy (BLE), ZigBee, near field communication (NFC), magnetic secure transmission, radio frequency (RF), and body area network (BAN). According to an embodiment of the present disclosure, the types of wireless communication may include a GNSS. The GNSS may be, for example, a global positioning system (GPS), a global navigation satellite system (GLONASS), a Beidou Navigation Satellite System (hereinafter "Beidou"), or a European Global Satellite-based Navigation System (Galileo). Hereinafter, in the present disclosure, the term "GPS" may be used interchangeably with the term "GNSS." The types of wired communication may include at least one of, for example, a USB, a high definition multimedia interface (HDMI), recommended standard 232 (RS-232), power line communication (PLC), and a plain old telephone service (POTS). The network 262 may include at least one of telecommunication networks, such as a computer network (e.g., a local area network (LAN) or a wide area network (WAN)), the Internet, and a telephone network.

Each of the first external electronic device 202 and second external electronic device 204 may be of a type identical to or different from that of the electronic device 201. According to various embodiments of the present disclosure, all or some of operations performed by the electronic device 201 may be performed by another electronic device or multiple electronic devices (e.g., the first external electronic device 202, the second external electronic device 204 or the server 206). According to an embodiment of the present disclosure, when the electronic device 201 needs to perform some functions or services automatically or by a request, the electronic device 201 may send, to another device (e.g., the first external electronic device 202, the second external electronic device 204, or the server 206), a request for performing at least some functions related to the functions or services, instead of performing the functions or services by itself, or additionally. Another electronic device (e.g., the first external electronic device 202, the second external electronic device 204, or the server 206) may execute the requested functions or the additional functions, and may deliver a result of the execution to the electronic device 201. The electronic device 201 may process the received result without any change or additionally and may provide the requested functions or services. To this end, use may be made of, for example, cloud computing technology, distributed computing technology, or client-server computing technology.

Figure 3:
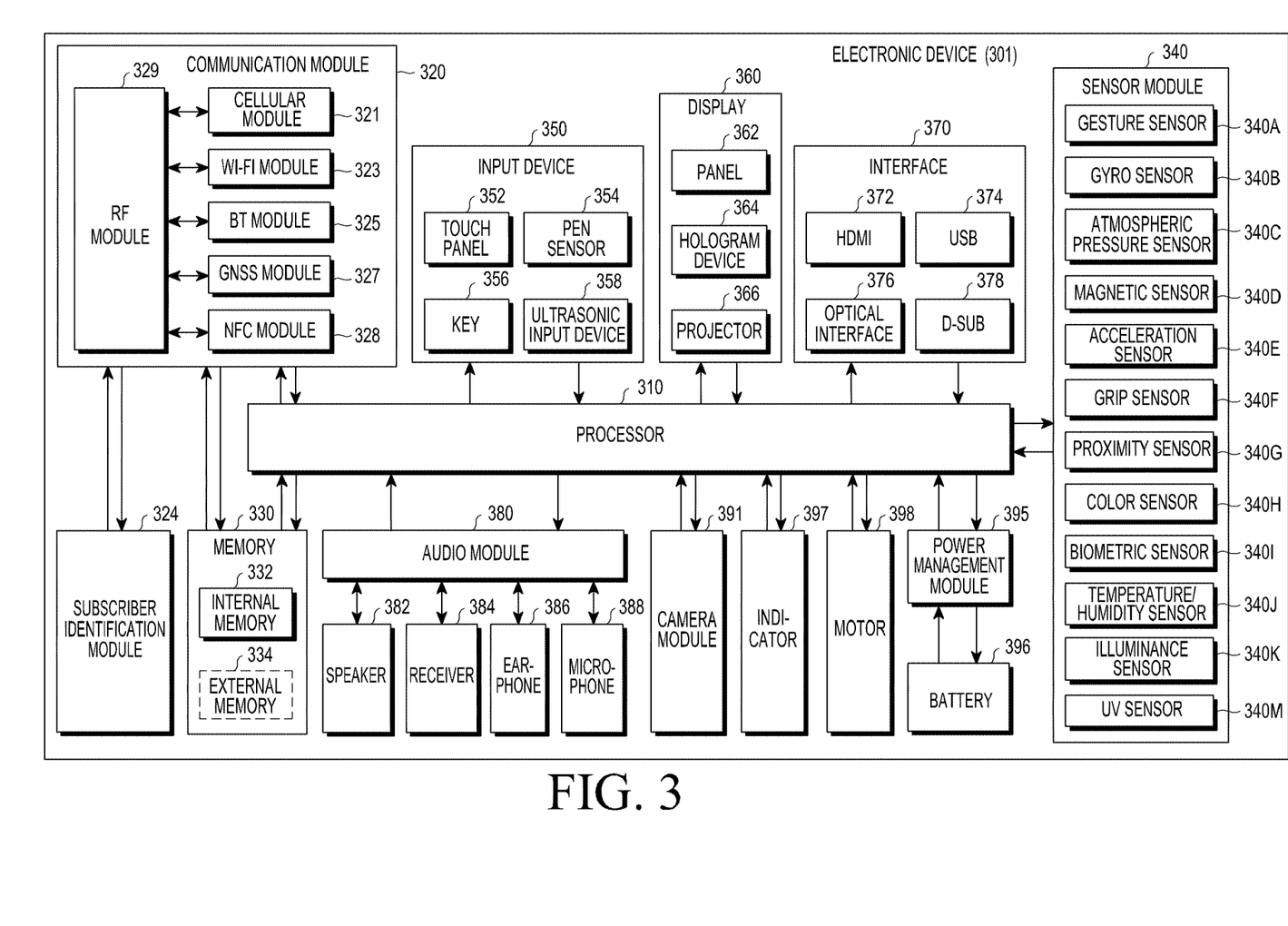
FIG. 3 is a block diagram illustrating a configuration of an electronic device according to an embodiment of the present disclosure.

FIG. 3 is a block diagram illustrating a configuration of an electronic device according to an embodiment of the present disclosure.

Referring to FIG. 3, the electronic device 301 may include, for example, the whole or part of the electronic device 201 illustrated in FIG. 2. The electronic device 301 may include at least one processor (e.g., an AP) 310, a communication module 320, a subscriber identification module 324, a memory 330, a sensor module 340, an input apparatus 350, a display 360, an interface 370, an audio module 380, a camera module 391, a power management module 395, a battery 396, an indicator 397, and a motor 398.

The processor 310 may control multiple hardware or software elements connected to the processor 310 and may perform the processing of and arithmetic operations on various data, by running, for example, an OS or an application program. The processor 310 may be implemented by, for example, a system on chip (SoC). According to an embodiment of the present disclosure, the processor 310 may further include a graphics processing unit (GPU) and/or an image signal processor. The processor 310 may include at least some (e.g., a cellular module 321) of the elements illustrated in FIG. 3. The processor 310 may load, into a volatile memory, instructions or data received from at least one (e.g., a non-volatile memory) of the other elements and may process the loaded instructions or data, and may store the resulting data in a non-volatile memory.

The communication module 320 may have a configuration identical or similar to that of the communication interface 270. The communication module 320 may include, for example, the cellular module 321, a Wi-Fi module 323, a BT module 325, a GNSS module 327, an NFC module 328, and an RF module 329. The cellular module 321 may provide a voice call, a video call, a text message service, an Internet service, and the like through a communication network. According to an embodiment of the present disclosure, the cellular module 321 may identify or authenticate the electronic device 301 in the communication network by using the subscriber identification module (e.g., a subscriber identity module (SIM) card) 324. According to an embodiment of the present disclosure, the cellular module 321 may perform at least some of the functions that the processor 310 may provide. According to an embodiment of the present disclosure, the cellular module 321 may include a CP. According to some embodiments of the present disclosure, at least some (e.g., two or more) of the cellular module 321, the Wi-Fi module 323, the BT module 325, the GNSS module 327, and the NFC module 328 may be included in one integrated chip (IC) or IC package. The RF module 329 may transmit and receive, for example, communication signals (e.g., RF signals). The RF module 329 may include, for example, a transceiver, a power amplifier module (PAM), a frequency filter, a low noise amplifier (LNA), and an antenna. According to another embodiment of the present disclosure, at least one of the cellular module 321, the Wi-Fi module 323, the BT module 325, the GNSS module 327, and the NFC module 328 may transmit and receive RF signals through a separate RF module. The subscriber identification module 324 may include, for example, a card including a subscriber identity module or an embedded SIM, and may contain unique identification information (e.g., an integrated circuit card identifier (ICCID)) or subscriber information (e.g., an international mobile subscriber identity (IMSI)).

The memory 330 (e.g., the memory 230) may include, for example, an internal memory 332 or an external memory 334. The internal memory 332 may include at least one of a volatile memory (e.g., a dynamic random access memory (DRAM), a static RAM (SRAM), a synchronous DRAM (SDRAM), etc.); and a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory, a hard drive, and a solid state drive (SSD)). The external memory 334 may include a flash drive, for example, a compact flash (CF), a secure digital (SD), a micro-SD (Micro-SD), a mini-SD (Mini-SD), an extreme Digital (xD), a multi-media card (MMC), a memory stick, or the like. The external memory 334 may be functionally or physically connected to the electronic device 301 through various interfaces.

The sensor module 340 may measure a physical quantity or may detect an operation state of the electronic device 301, and may convert the measured physical quantity or the detected operation state into an electrical signal. The sensor module 340 may include at least one of, for example, a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red-green-blue (RGB) sensor), a biometric sensor 340I, a temperature/humidity sensor 340J, an illuminance sensor 340K, and an ultraviolet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may further include a control circuit for controlling one or more sensors included therein. In some embodiments of the present disclosure, the electronic device 301 may further include a processor configured to control the sensor module 340 as a part of or separately from the processor 310, and may control the sensor module 340 while the processor 310 is in a sleep state.

The input apparatus 350 may include, for example, a touch panel 352, a (digital) pen sensor 354, a key 356, and an ultrasonic input unit 358. The touch panel 352 may use at least one of a capacitive scheme, a resistive scheme, an infrared scheme, and a surface acoustic wave scheme. Also, the touch panel 352 may further include a control circuit. The touch panel 352 may further include a tactile layer and may provide a tactile reaction to the user. The (digital) pen sensor 354 may include a recognition sheet that is a part of the touch panel or is separated from the touch panel. The key 356 may be a physical button, an optical key, and a keypad. The ultrasonic input unit 358 may sense an ultrasonic wave generated by an input means through a microphone (e.g., a microphone 388), and may confirm data corresponding to the sensed ultrasonic wave.

The display 360 (e.g., the display 260) may include a panel 362, a hologram device 364, a projector 366, and/or a control circuit for controlling the same. The panel 362 may be implemented to be flexible, transparent, or wearable. The panel 362 together with the touch panel 352 may be implemented as one or more modules. According to an embodiment of the present disclosure, the panel 362 may include a pressure sensor (or a force sensor) capable of measuring the strength of pressure of a user's touch. The pressure sensor and the touch panel 352 may be integrated into one unit, or the pressure sensor may be implemented by one or more sensors separated from the touch panel 352. The hologram device 364 may display a three-dimensional image in the air by using the interference of light. The projector 366 may display an image by projecting light onto a screen. The screen may be located inside or outside the electronic device 301. The interface 370 may include, for example, a high-definition multimedia interface (HDMI) 372, a universal serial bus (USB) 374, an optical interface 376, and a D-subminiature (D-sub) 378. The interface 370 may be included in the communication interface 270 illustrated in FIG. 2. Additionally or alternatively, the interface 370 may include a mobile high-definition link (MHL) interface, a secure digital (SD) card/multi-media Card (MMC) interface, or an Infrared Data Association (IrDA) standard interface.

The audio module 380 may bidirectionally convert between a sound and an electrical signal. At least some elements of the audio module 380 may be included in the input/output interface 250 illustrated in FIG. 2. The audio module 380 may process sound information which is input or output through a speaker 382, a receiver 384, an earphone 386, the microphone 388, or the like. The camera module 391 is a device capable of capturing a still image and a moving image. According to an embodiment of the present disclosure, the camera module 391 may include one or more image sensors (e.g., a front sensor or a back sensor), a lens, an image signal processor (ISP), and a flash (e.g., an LED, a xenon lamp, or the like). The power management module 395 may manage power of the electronic device 301. According to an embodiment of the present disclosure, the power management module 395 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic method, and the like. The PMIC may further include additional circuits (e.g., a coil loop, a resonant circuit, a rectifier, etc.) for wireless charging. The battery gauge may measure a remaining amount of the battery 396, and a voltage, a current, or a temperature during charging. The battery 396 may include a rechargeable battery and/or a solar battery.

The indicator 397 may display a particular state (e.g., a booting state, a message state, a charging state, or the like) of the electronic device 301 or a part (e.g., the processor 310) of the electronic device 301. The motor 398 may convert an electrical signal into a mechanical vibration, and may generate a vibration, a haptic effect, or the like. The electronic device 301 may include a mobile television (TV) support unit (e.g., a GPU) that may process media data according to a standard, such as digital multimedia broadcasting (DMB), digital video broadcasting (DVB), or media-FLO™. Each of the above-described elements of hardware according to the present disclosure may include one or more components, and the names of the corresponding elements may vary based on the type of electronic device. In various embodiments of the present disclosure, the electronic device (e.g., the electronic device 201) may omit some elements or may further include additional elements, or some of the elements of the electronic device may be combined into one entity, which may perform functions identical to those of the relevant elements before the combination thereof.

Figure 4:
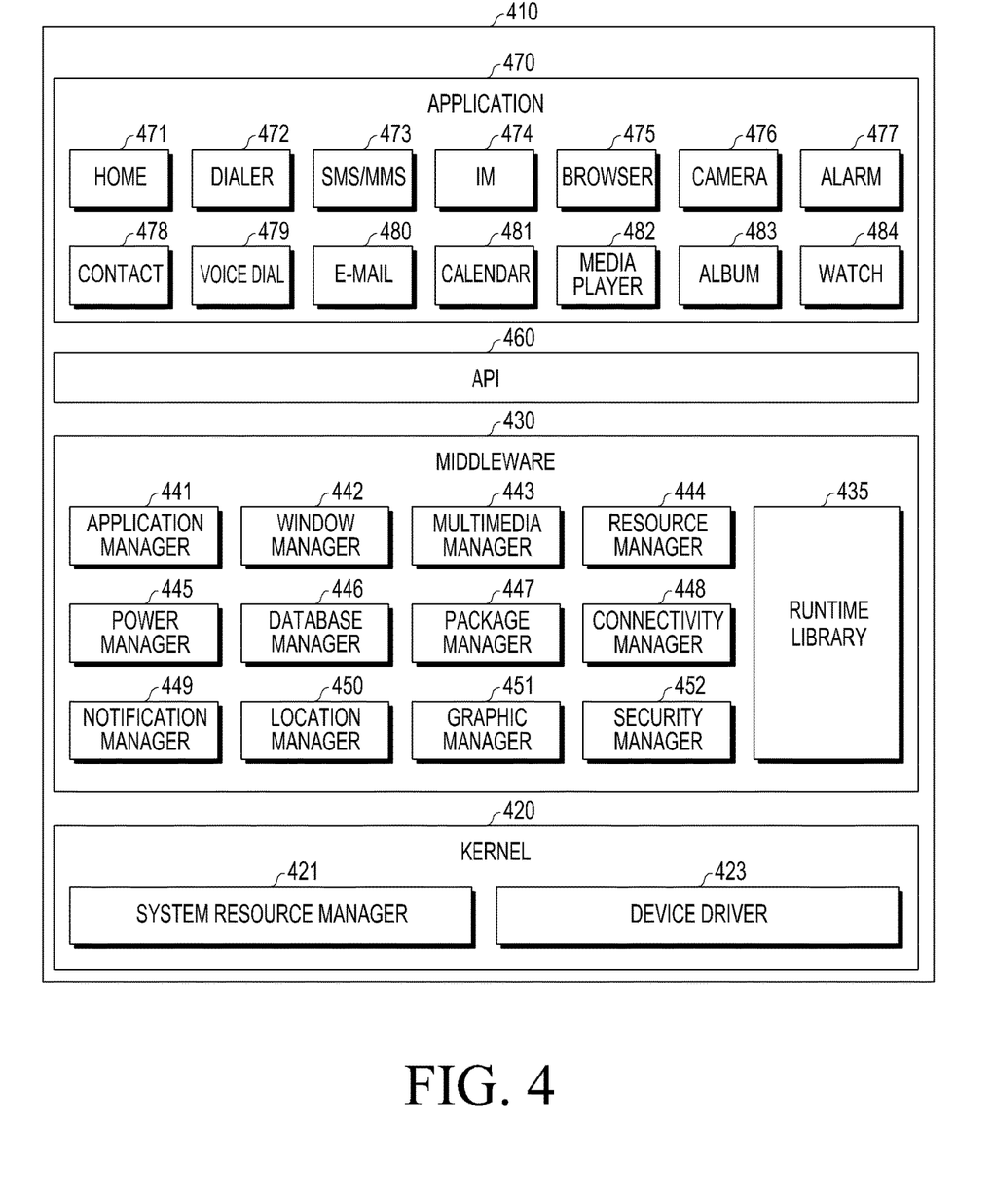
FIG. 4 is a block diagram illustrating a configuration of a program module according to an embodiment of the present disclosure.

FIG. 4 is a block diagram illustrating a configuration of a program module according to an embodiment of the present disclosure.

Referring to FIG. 4, the program module 410 (e.g., the program 240) may include an OS for controlling resources related to the electronic device (e.g., the electronic device 201) and/or various applications (e.g., the application programs 247) executed in the OS. The OS may be, for example, Android™, iOS™, Windows™, Symbian™, Tizen™, and Bada™. Referring to FIG. 4, the program module 410 may include a kernel 420 (e.g., the kernel 241), middleware 430 (e.g., the middleware 243), an API 460 (e.g., the API 245), and/or an application 470 (e.g., the application program 247). At least some of the program module 410 may be preloaded on the electronic device, or may be downloaded from an external electronic device (e.g., the electronic device 202 or 204, or the server 206).

The kernel 420 may include, for example, a system resource manager 421 and/or a device driver 423. The system resource manager 421 may control, allocate, or retrieve system resources. According to an embodiment of the present disclosure, the system resource manager 421 may include a process manager, a memory manager, or a file system manager. The device driver 423 may include a display driver, a camera driver, a Bluetooth driver, a shared memory driver, a USB driver, a keypad driver, a Wi-Fi driver, an audio driver, or an inter-process communication (IPC) driver.

The middleware 430 may provide a function required in common by the applications 470, or may provide various functions to the applications 470 through the API 460 so as to enable the applications 470 to use the limited system resources within the electronic device. According to an embodiment of the present disclosure, the middleware 430 may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, and a security manager 452.

The runtime library 435 may include a library module that a compiler uses to add a new function by using a programming language during the execution of the application 470. The runtime library 435 may manage input/output, manage a memory, or process an arithmetic function. The application manager 441 may manage the life cycle of the application 470. The window manager 442 may manage graphical user interface (GUI) resources used for the screen. The multimedia manager 443 may determine formats required to reproduce media files, and may encode or decode a media file by using a coder/decoder (codec) appropriate for the relevant format. The resource manager 444 may manage a source code of the application 470 or a space in a memory. The power manager 445 may manage the capacity of a battery or power, and may provide power information required for an operation of the electronic device. According to an embodiment of the present disclosure, the power manager 445 may operate in conjunction with a basic input/output system (BIOS). The database manager 446 may generate, search, or change a database to be used by the application 470. The package manager 447 may manage the installation or update of an application distributed in the form of a package file.

The connectivity manager 448 may manage a wireless connection. The notification manager 449 may provide a user with an event, such as an arrival message, an appointment, a proximity notification, and the like. The location manager 450 may manage, for example, location information of the electronic device 301. The graphic manager 451 may manage a graphic effect, which is to be provided to the user, or a user interface related to the graphic effect. The security manager 452 may provide system security or user authentication. According to an embodiment of the present disclosure, the middleware 430 may include a telephony manager for managing a voice call function or a video call function of the electronic device, or may include a middleware module capable of forming a combination of functions of the above-described elements. According to an embodiment of the present disclosure, the middleware 430 may provide a module specialized for each type of OS. The middleware 430 may dynamically delete some of the existing elements, or may add new elements.

The API 460 may be a set of API programming functions, and may be provided with a different configuration for each OS. For example, in the case of Android or iOS, one API set may be provided for each platform, and in the case of Tizen, two or more API sets may be provided for each platform.

The application 470 may include a home 471, a dialer 472, a short message service (SMS)/multimedia messaging service (MIMS) 473, an instant message (IM) 474, a browser 475, a camera 476, an alarm 477, a contact 478, a voice dial 479, an e-mail 480, a calendar 481, a media player 482, an album 483, a watch 484, a health care application (e.g., which measures an exercise quantity, a blood sugar level, or the like), and an application for providing environmental information (e.g., information on atmospheric pressure, humidity, or temperature). According to an embodiment of the present disclosure, the application 470 may include an information exchange application capable of supporting information exchange between the electronic device 301 and an external electronic device. The information exchange application may include a notification relay application for delivering particular information to an external electronic device or a device management application for managing an external electronic device. The notification relay application may deliver, to an external electronic device, notification information generated by the other applications of the electronic device, or may receive notification information from an external electronic device and may provide the received notification information to the user. The device management application may install, delete, or update a function (e.g., turning on/off an external electronic device itself (or some elements thereof) or adjusting the brightness (or resolution) of the display) of the external electronic device communicating with the electronic device, or an application executed by the external electronic device. According to an embodiment of the present disclosure, the application 470 may include an application (e.g., a health care application of a mobile medical device) designated according to an attribute of an external electronic device. According to an embodiment of the present disclosure, the application 470 may include an application received from an external electronic device. At least part of the program module 410 may be implemented (e.g., executed) in software, firmware, hardware (e.g., the processor 310), or a combination of at least two thereof, and may include a module, a program, a routine, a set of instructions, or a process for performing one or more functions.

Figure 5:
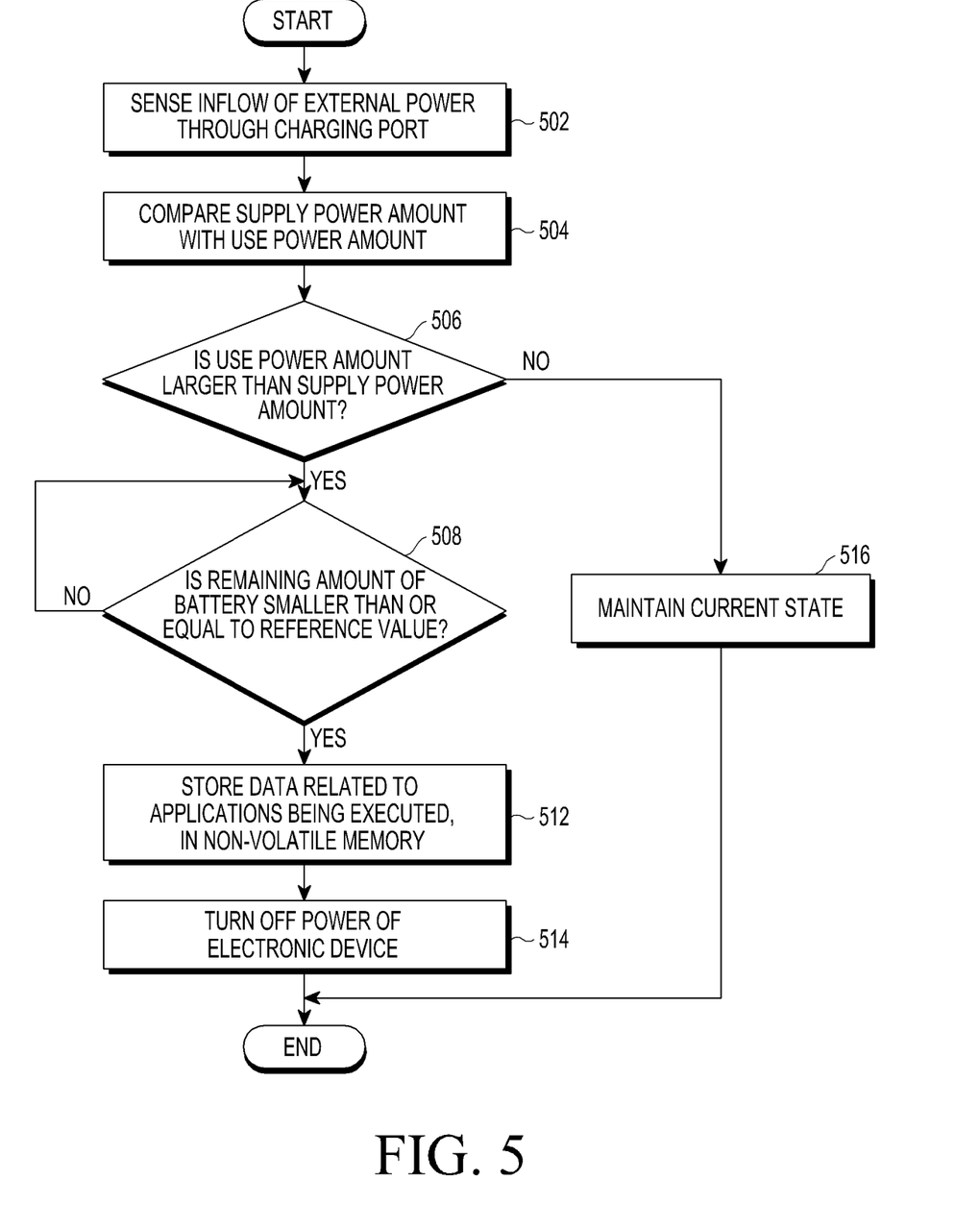
FIG. 5 is a flowchart illustrating an operating method of an electronic device according to an embodiment of the present disclosure.

FIG. 5 is a flowchart illustrating an operating method of an electronic device according to an embodiment of the present disclosure.

Referring to FIG. 5, in operation 502, the processor 120 of the electronic device 101 may sense the inflow of external power through the charging port 110. When external power flows into the electronic device 101 through the charging port 110, in operation 504, the processor 120 may compare the amount (i.e., a supply power amount) of external power flowing into the electronic device 101 with a use power amount of power used by the electronic device 101. According to an embodiment of the present disclosure, the processor 120 may measure a supply power amount and a use power amount during a preset time period (e.g., 1 minute).

In operation 506, the processor 120 may determine whether the use power amount is larger than the supply power amount. When the use power amount is smaller than or equal to the supply power amount and a remaining amount of the battery 140 is not zero, a remaining amount of the battery 140 of the electronic device 101 may not become zero while the electronic device 101 is supplied with power from the external power source 102. In contrast, when the use power amount is larger than the supply power amount, a remaining amount of the battery 140 may become zero even when the electronic device 101 is being supplied with power from the external power source 102. That is, when the use power amount is larger than the supply power amount, sudden shutdown of the electronic device 101 may occur. Accordingly, the processor 120 may control an operation of the electronic device 101 in a different scheme according to a result of the comparison of the use power amount with the supply power amount.

When it is determined in operation 506 that the use power amount is smaller than or equal to the supply power amount (No in operation 506), the processor 120 may proceed to operation 516 and may control the electronic device 101 to maintain a current state. When it is determined in operation 506 that the use power amount is larger than the supply power amount (Yes in operation 506), the processor 120 may proceed to operation 508 and may determine whether a remaining amount of the battery 140 is smaller than or equal to a preset reference value (e.g., 5%).

When it is determined in operation 508 that the remaining amount of the battery 140 is larger than the reference value (No in operation 508), the processor 120 may control the electronic device 101 to maintain a current state until the remaining amount of the battery 140 becomes smaller than or equal to the reference value. When it is determined in operation 508 that the remaining amount of the battery 140 is smaller than or equal to the reference value (Yes in operation 508), the processor 120 may proceed to operation 512 and may store data, which is related to applications being executed by the electronic device 101, in a non-volatile memory. In operation 514, the processor 120 may turn off power of the electronic device 101. According to an embodiment of the present disclosure, in a state of being powered off as in operation 514, the electronic device 101 may receive external power through the charging port 110, and may be charged with the received external power.

According to another embodiment of the present disclosure, when it is determined in operation 508 that the remaining amount of the battery 140 is smaller than or equal to the reference value (Yes in operation 508), the processor 120 may control the display 160 to display a notification message for requesting a user to connect a charging adapter, for example, a regular charging adapter, of the electronic device 101 to the electronic device 101.

A method for operating an electronic device including a rechargeable battery according to various embodiments of the present disclosure may include: comparing a supply power amount of power supplied from an outside through a charging port with a use power amount of power used by the electronic device; if the use power amount is larger than the supply power amount, determining whether a remaining amount of the battery is smaller than or equal to a reference value; and if the remaining amount of the battery is smaller than or equal to the reference value, switching the electronic device to a power-saving mode.

Figure 6:
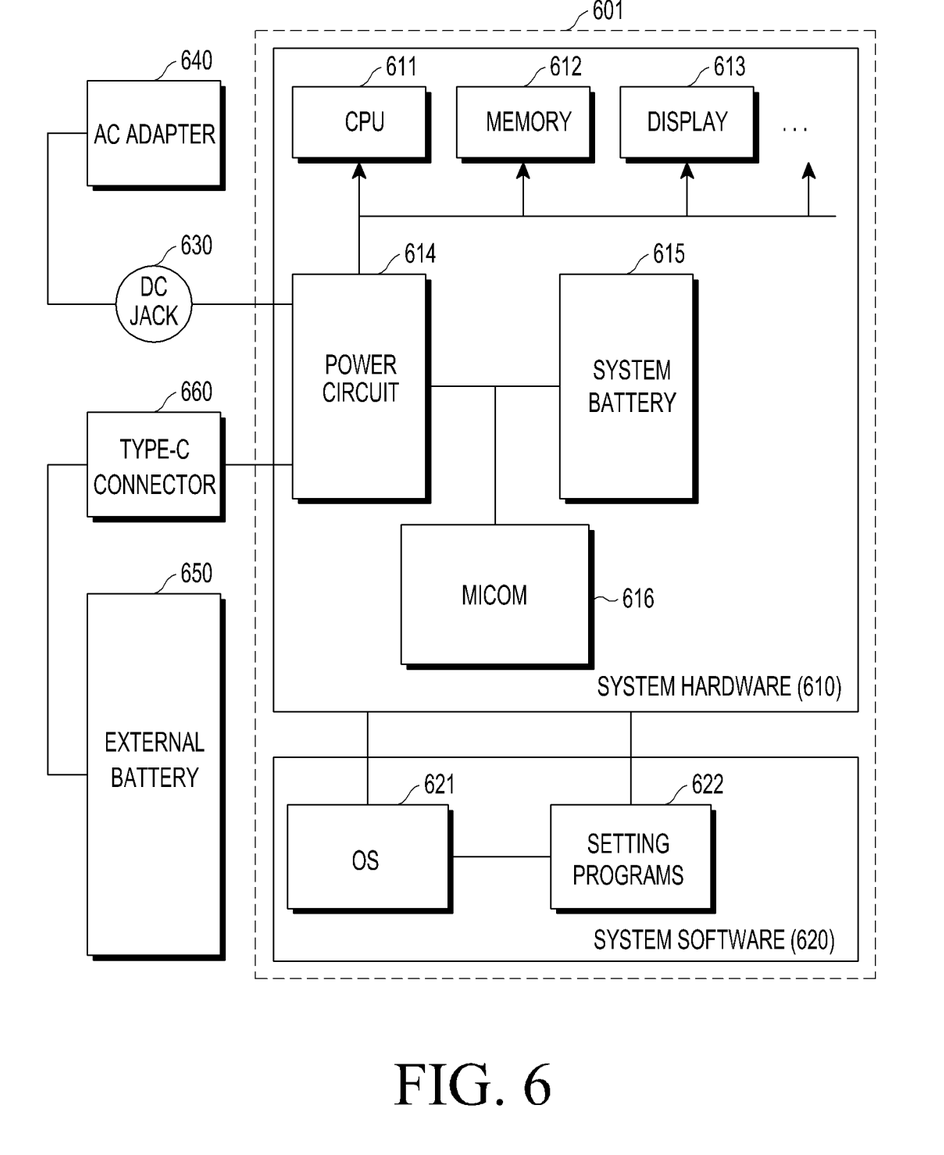
FIG. 6 is a block diagram illustrating a configuration of an electronic device according to an embodiment of the present disclosure.

FIG. 6 is a block diagram illustrating a configuration of an electronic device according to an embodiment of the present disclosure.

Referring to FIG. 6, the electronic device 601 may be implemented to include a system hardware 610 and a system software 620. The system hardware 610 may include a CPU 611, a memory 612, a display 613, a power circuit 614, a system battery 615, or a microcomputer (MICOM) 616. The system software 620 may include an OS 621 or setting programs 622.

The CPU 611 may perform calculations or data processing related to control over and/or communication by at least one of the other elements of the electronic device 601 (e.g., the electronic device 101). The memory 612 may store data for controlling an operation of the electronic device 601, and may store data (e.g., navigation data, moving image data, game data, etc.) related to at least one application being executed, when the electronic device 601 is switched to a power-saving mode. When the electronic device 601 is switched to the power-saving mode, the display 613 may output a message for notifying of the switching of the electronic device 601 to the power-saving mode.

The power circuit 614 may be connected to an alternating current (AC) adapter 640 through a direct current (DC) jack 630 and may be supplied with power from the AC adapter 640. The DC jack 630 may convert AC power, which is supplied from the AC adapter 640, into DC power and may supply DC power to the power circuit 614. Also, the power circuit 614 may be connected to a type-C connector 660 and may receive power from an external battery (or HP travel adapter (TA), type-C adapter) 650. The power circuit 614 may supply DC power supplied through the DC jack 630 or power supplied through the type-C connector 660 to the CPU 611, the memory 612, the display 613, the system battery 615, or the MICOM 616. Power which is input through the DC jack 630 or the type-C connector 660 may be delivered to the CPU 611, the memory 612, the display 613, or the MICOM 616 through the power circuit 614 or the system battery 615, which allows the OS 621 or the setting programs 622 to be driven.

The MICOM 616 may determine whether the system battery 615 is being charged, through communication with the power circuit 614. The MICOM 616 may check the system battery 615 for a remaining amount of power through the communication. According to an embodiment of the present disclosure, when a remaining amount of the system battery 615 is smaller than or equal to a reference value, the MICOM 616, the OS 621, or the setting programs 622 may control the electronic device 601 to be switched to a power-saving mode. When the electronic device 601 is switched to the power-saving mode, the CPU 611 may store data, which is related to applications being executed by the electronic device 601, in the memory 612.

According to an embodiment of the present disclosure, when a result of the communication between the power circuit 614 and the MICOM 616 shows that the power circuit 614 is connected to the external battery 650 through the type-C connector 660, the MICOM 616 may monitor, in real time, a remaining amount of power of the system battery 615 under the control of the OS 621. Therefore, when a remaining amount of power becomes smaller than or equal to a preset reference value, the MICOM 616 may switch the electronic device 601 to the power-saving mode.

Figure 7:
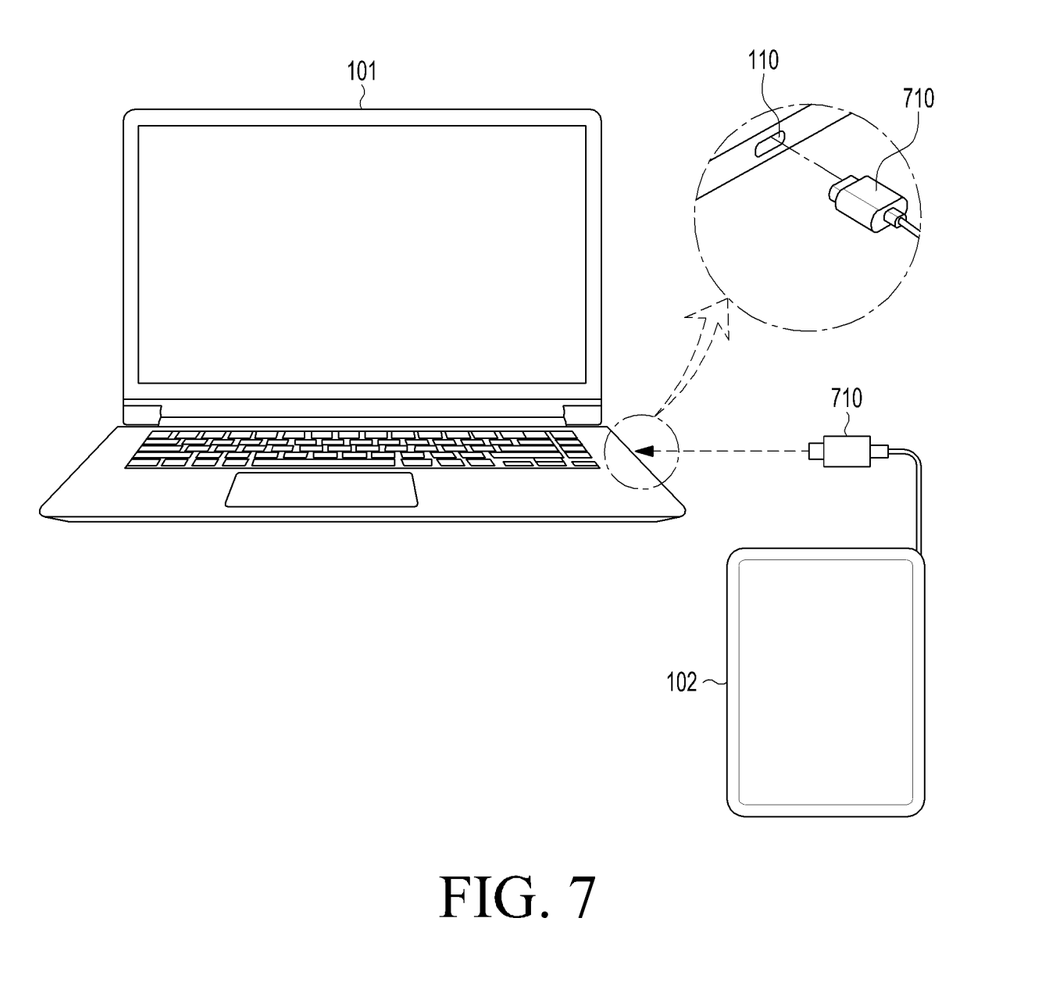
FIG. 7 is a view illustrating an electronic device according to an embodiment of the present disclosure.

FIG. 7 is a view illustrating an electronic device according to an embodiment of the present disclosure.

Referring to FIG. 7, the electronic device 101 may be connected to the external power source 102 through the charging port 110 of the electronic device 101 and an interface 710 of the external power source 102. When the charging port 110 is connected to the interface 710, the electronic device 101 may receive power from the external power source 102.

Figure 8A:
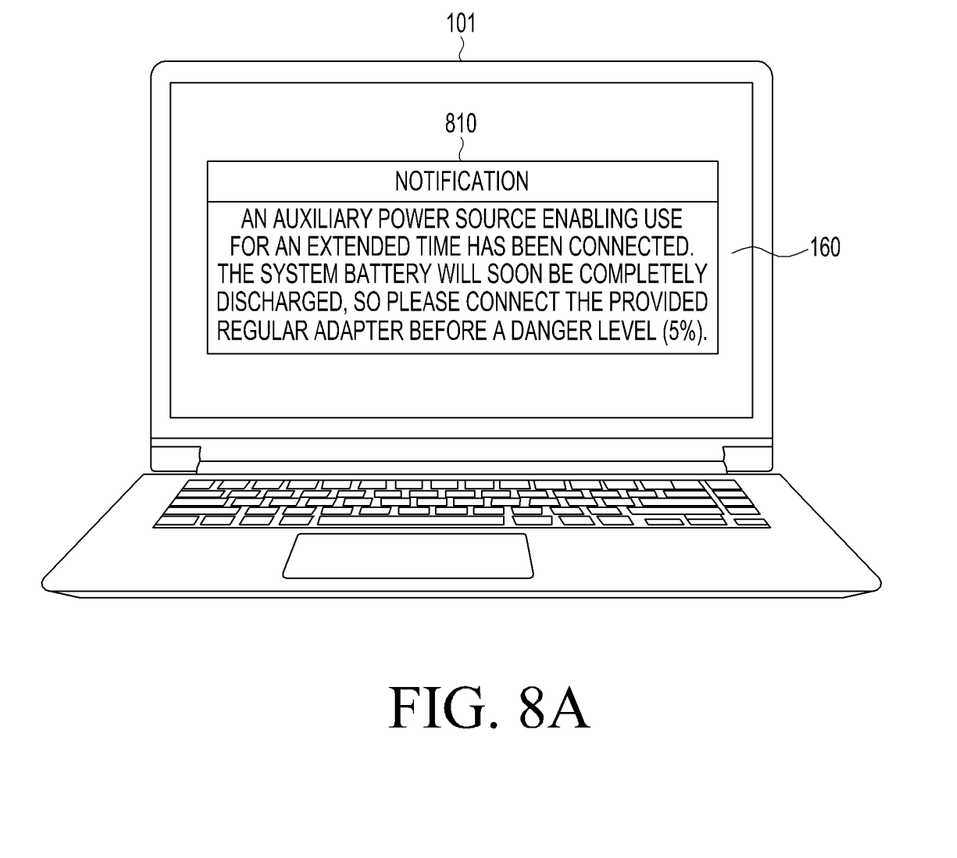
FIGS. 8A and 8B are views each illustrating an electronic device being charged according to various embodiments of the present disclosure.
Figure 8B:
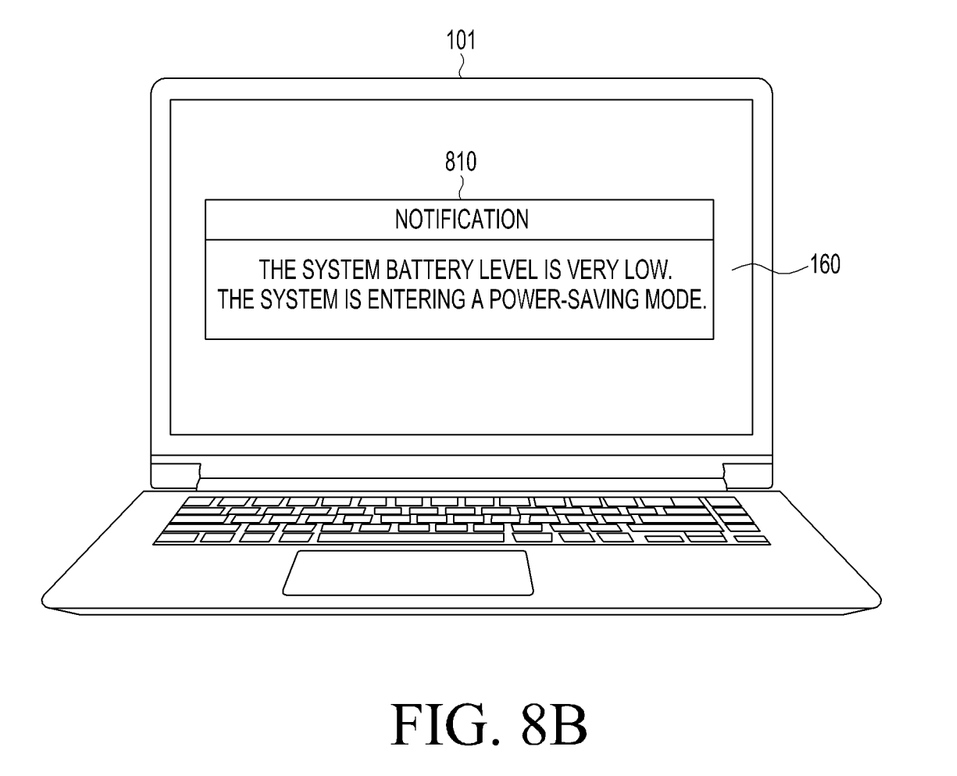

FIGS. 8A and 8B are views each illustrating an electronic device being charged according to various embodiments of the present disclosure.

Referring to FIG. 8A, when a supply power amount of power from the external power source 102 is smaller than or equal to a use power amount of the electronic device 101, the processor 120 of the electronic device 101 may display a notification window 810 on the display 160. The processor 120 may notify a user that the external power source 102 is connected to the electronic device 101, on the notification window 810. Also, on the notification window 810, the processor 120 may warn of the possibility of discharge or shutdown of the electronic device 101, and simultaneously, may request the user to connect a regular adapter to the electronic device 101.

Referring to FIG. 8B, when a supply power amount of power from the external power source 102 is smaller than or equal to a use power amount of the electronic device 101 and when a remaining amount of the battery 140 of the electronic device 101 is smaller than or equal to a reference value (e.g., 5%), the processor 120 of the electronic device 101 may display a notification window 820 on the display 160. The processor 120 of the electronic device 101 may notify a user that the electronic device 101 is entering a power-saving mode, on the notification window 820. In the power-saving mode, the processor 120 may store data, which is associated with at least one application being executed by the electronic device 101, in a non-volatile memory, and may turn off power of the electronic device 101.

In accordance with still another aspect of the present disclosure, provided is a storage medium storing instructions configured to cause at least one processor to perform at least one operation when executed by the at least one processor. The at least one operation may include: comparing a supply power amount of power supplied from an outside through a charging port with a use power amount of power used by the electronic device; if the use power amount is larger than the supply power amount, determining whether a remaining amount of the battery is smaller than or equal to a reference value; and if the remaining amount of the battery is smaller than or equal to the reference value, switching the electronic device to a power-saving mode.

The term "module" as used herein may include a unit implemented in hardware, software, or firmware, and for example, may be used interchangeably with the term "logic", "logical block", "component", "circuit", or the like. The "module" may be an integrated component, or a minimum unit for performing one or more functions or a part thereof. The "module" may be mechanically or electronically implemented, and may include, for example, an application-specific integrated circuit (ASIC) chip, a field-programmable gate array (FPGA), or a programmable logic device which performs certain operations and is already known or is to be developed in the future. At least part of the device (e.g., modules or functions thereof) or the method (e.g., operations) according to various embodiments of the present disclosure may be implemented by an instruction which is stored in a computer-readable storage medium (e.g., the memory 130) in the form of a program module. When the instruction is executed by a processor (e.g., the processor 120), the processor may perform a function corresponding to the instruction. Examples of the computer-readable recoding medium may include: magnetic media, such as a hard disk, a floppy disk, and a magnetic tape; optical media, such as a compact disc ROM (CD-ROM) and a digital versatile disc (DVD); magneto-optical media, such as a floptical disk; an internal memory; and the like. The instructions may include a code made by a compiler or a code which can be executed by an interpreter. The module or program module according to various embodiments of the present disclosure may include at least one of the aforementioned elements, may further include other elements, or some of the aforementioned elements may be omitted. Operations executed by the module, program module, or other elements according to various embodiments of the present disclosure may be executed sequentially, in parallel, repeatedly, or in a heuristic manner. Alternatively, at least some operations may be executed in a different order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
  a rechargeable battery;
  a charging port; and
  at least one processor configured to, in response to a supply power amount of power supplied from an outside through the charging port being smaller than a use power amount of power used by the electronic device and a remaining amount of power of the battery being smaller than or equal to a reference value, switch the electronic device to a power-saving mode,
  wherein the switching of the electronic device to the power-saving mode comprises storing data related to at least one application being executed by the electronic device in a non-volatile memory and turning off power of the electronic device.

2. The electronic device of claim 1, wherein the charging port corresponds to a type-C universal serial bus (USB) port.

3. The electronic device of claim 1, wherein the at least one processor is further configured to compare the supply power amount with the use power amount by comparing the supply power amount with the use power amount during a reference time period.

4. The electronic device of claim 1, further comprising:
  a display,
  wherein the at least one processor is further configured to, in response to the remaining amount of power of the battery being smaller than the reference value, control the display to display a first notification message for power charging using an adapter.

5. The electronic device of claim 4, wherein the at least one processor is further configured to, in response to the electronic device being switched to the power-saving mode, control the display to display a second notification message for notifying of turning off power of the electronic device.

6. A method for operating an electronic device including a rechargeable battery and a charging port, the method comprising:

comparing a supply power amount of power supplied from an outside through the charging port with a use power amount of power used by the electronic device;

in response to the use power amount being larger than the supply power amount, determining whether a remaining amount of power of the rechargeable battery is smaller than or equal to a reference value; and in response to the remaining amount of power of the rechargeable battery being smaller than or equal to the reference value, switching the electronic device to a power-saving mode, wherein the switching of the electronic device to the power-saving mode comprises storing data related to at least one application being executed by the electronic device in a non-volatile memory and turning off power of the electronic device.

7. The method of claim 6, wherein the charging port corresponds to a type-C universal serial bus (USB) port.

8. The method of claim 6, wherein the comparing of the supply power amount with the use power amount comprises comparing the supply power amount with the use power amount during a reference time period.

9. The method of claim 6, further comprising, in response to the electronic device being switched to the power-saving mode, displaying a first notification message for notifying of turning off of power of the electronic device.

10. The method of claim 6, further comprising, in response to the remaining amount of power of the rechargeable battery being smaller than the reference value, displaying a second notification message for power charging using a regular adapter.

11. A non-transitory computer-readable storage medium storing instructions that, when executed by at least one processor, cause the at least one processor to perform at least one operation comprising:

when power is supplied from an outside through a charging port, comparing a supply power amount of power with a use power amount of power used by an electronic device;

in response to the use power amount being larger than the supply power amount, determining whether a remaining amount of power in a battery of the electronic device is smaller than or equal to a reference value; and in response to the remaining amount of power in the battery being smaller than or equal to the reference value, switching the electronic device to a power-saving mode, wherein the switching of the electronic device to the power-saving mode comprises storing data related to at least one application being executed by the electronic device in a non-volatile memory and turning off power of the electronic device.

* * * * *